(12) United States Patent
Astudillo et al.

(10) Patent No.: US 9,258,354 B2
(45) Date of Patent: Feb. 9, 2016

(54) PROGRESSIVE MULTIMEDIA SYNCHRONIZATION

(75) Inventors: Manuel Astudillo, Lomma (SE); Johan Gulliksson, Bjarred (SE); Sami Niemi, Skanor (SE); Martin Andersson, Lund (SE)

(73) Assignee: Mobile Imaging in Sweden AB, Lund (SE)

( * ) Notice: Subject to any disclaimer, the term of this patent is extended or adjusted under 35 U.S.C. 154(b) by 110 days.

(21) Appl. No.: 13/881,950

(22) PCT Filed: Oct. 31, 2011
(Under 37 CFR 1.47)

(86) PCT No.: PCT/SE2011/051296
§ 371 (c)(1),
(2), (4) Date: Feb. 21, 2014

(87) PCT Pub. No.: WO2012/060769
PCT Pub. Date: May 10, 2012

(65) Prior Publication Data
US 2014/0237083 A1    Aug. 21, 2014

Related U.S. Application Data

(60) Provisional application No. 61/409,620, filed on Nov. 3, 2010.

(51) Int. Cl.
*G06F 15/16* (2006.01)
*H04L 29/08* (2006.01)

(52) U.S. Cl.
CPC ............ *H04L 67/06* (2013.01); *H04L 67/1095* (2013.01)

(58) Field of Classification Search
USPC .............. 709/219; 707/728; 725/46; 382/232
See application file for complete search history.

(56) References Cited

U.S. PATENT DOCUMENTS 8,121,417 B2 *  2/2012  Gering et al. ................. 382/232
2002/0032027 A1  3/2002  Kirani et al.
(Continued)

FOREIGN PATENT DOCUMENTS

CN     101272587 A     9/2008
CN     101273604 A     9/2008
(Continued)

OTHER PUBLICATIONS

International Search Report and Written Opinion, received in corresponding Patent Cooperation Treaty Application No. PCT/SE2011/051296, dated May 3, 2012. 13 pages.
(Continued)

*Primary Examiner* — Quang N Nguyen
(74) *Attorney, Agent, or Firm* — Locke Lord LLP

(57) ABSTRACT

There is disclosed means for uploading/downloading images to/from a remote server and for viewing the same. The uploading/downloading of the images to/from the remote server is parallel instead of serial. This means that the images, instead of being transferred as a sequential stream of bytes, instead are arranged in scans of image data in such a way that the uploaded/downloaded images can be browsed early albeit at a lower quality than if the entire image data is considered. As in the serial case, it is possible to interrupt the uploading/downloading process at any time, and still browse the received image data. Likewise it is possible to re-start the uploading/downloading process in the future.

15 Claims, 4 Drawing Sheets

(56) References Cited

U.S. PATENT DOCUMENTS

| | | | |
|---|---|---|---|
| 2002/0194603 A1* | 12/2002 | Connelly | 725/46 |
| 2003/0005465 A1* | 1/2003 | Connelly | 709/219 |
| 2003/0174893 A1 | 9/2003 | Sun et al. | |
| 2004/0032968 A1 | 2/2004 | Andrew et al. | |
| 2007/0294333 A1 | 12/2007 | Yang et al. | |
| 2010/0268709 A1* | 10/2010 | Cozzi | 707/728 |

FOREIGN PATENT DOCUMENTS

| | | | |
|---|---|---|---|
| EP | 1351187 | A2 | 10/2003 |
| EP | 2109283 | A1 | 10/2009 |
| WO | 2007036032 | A1 | 4/2007 |

OTHER PUBLICATIONS

Wallace, G.K.; , "The JPEG still picture compression standard," Consumer Electronics, IEEE Transactions on , vol. 38, No. 1, pp. xviii-xxxiv, Feb. 1992; abstract; Section 7.3.

English Language Machine Translation of Chinese Patent Application Publication No. CN101273604A—77 pages.

English Language Machine Translation of Chinese Patent Application Publication No. CN101272587A—31 pages.

* cited by examiner

PROGRESSIVE MULTIMEDIA SYNCHRONIZATION

RELATED APPLICATION

This application was originally filed as PCT Application No. PCT/SE2011/051296 filed Oct. 31, 2011, which claims priority benefit to U.S. Provisional Patent Application No. 61/409,620 filed Nov. 3, 2010.

TECHNICAL FIELD OF THE INVENTION

The present invention relates in general to the field of multimedia communication and in particular to progressive synchronization of multimedia content. There is also provided apparatuses and a computer program product thereof.

BACKGROUND OF THE INVENTION

Over the last few years communications devices, such as mobile phones, have evolved from being just communications devices to being handheld multimedia devices. In addition, more and more devices are being provided with communications interfaces. Thus, the number of devices being able to communicate information between each other is constantly increasing.

The number of services and applications being based on communications between such devices is also increasing. A few examples include, but are not limited to, digital social medias based on digital networks, instant message sharing, sharing and displaying of information, and the like.

Thus, as the number of communications devices increases so too does the need to communicate data between the communications devices.

However, due to bandwidth constraints the process of synchronizing multimedia content between a server of content and a requestor of content may still take considerable time. This is particularly true if a user of a communications device (for example a mobile phone) wishes to upload multimedia content, (for example digital images) to a server, such that the uploaded content can be published (for example in a digital album in a digital social media).

SUMMARY OF THE INVENTION

The inventors of the disclosed embodiments have realized that although methods, apparatuses and computer program products according to the state of the art are able to provide means for synchronizing multimedia content between a server device and a client device one drawback may be the time duration for performing such synchronization.

Moreover, communications devices, such as mobile phones, can create very large images of several megapixels, while the same communications devices may have very constrained viewing screens (both in terms of resolution and in size). Further, it has been discovered that it often is unnecessary to upload the whole multimedia content before the client can receive a preview of the multimedia content that will satisfy most users.

In view of the foregoing it may therefore be desirable to find means which enable faster synchronization of multimedia content between a server and a client. According to a first aspect there is provided a method for synchronizing multimedia content between a server device and a storing device, comprising: providing multimedia content at the storing device; dividing the multimedia content into at least two packages; classifying, depending on data in the at least two packages and by using a relevance criterion, the at least two packages as a relevant package and at least one less relevant package; and transmitting the relevant package from the storing device to the server device.

Advantageously this provides an effective uploading process that makes it possible for users to share their multimedia content much faster than using a traditional sequential process. This also enables for example full JPEG data to be uploaded and overtime having the same representation of the image data in the server as in the storing device that produced the image. This may provide good user experience when uploading multimedia content to a server device, even when the transmission between the server device and the storing device has low bandwidth.

Multimedia content may come in various formats. Packages represent the multimedia content transformed into multiple lesser representations of the original multimedia content, where the lesser representations often present the multimedia content in a smaller scale. The packages may or may not be dependent on other packages. A set of rules governs how multimedia content is transformed into packages.

Representations representing the multimedia content at the same or similar scales may be stored close together (for example in terms of the number of bytes separating the data representing multimedia content at the same or similar scales) in order to facilitate quick access of similar data. One or more types of transcoding may be involved between transmitting and storing multimedia content data. It may be desired that representations representing small scales of the multimedia content are transmitted first, and representations of larger scales of the same multimedia content are transmitted later. The later transmissions neither contain redundant information and nor do they contain information that has already been transmitted.

In view of, for example, the JPEG progressive standard the transmitter and/or receiver of the transmitted multimedia content needs to keep track of where in the encoding process it is at a given moment, so that the process can be paused and resumed. For instance information regarding the currently transmitted scan, data unit and/or coefficient may be provided. Such information can be stored in an exchangeable image file format (Exif) tag, and the file may have a tail appended to it in order to fulfill the JPEG progressive standard. For example, the tail may have dummy data, such as empty scans and an end of image (EOI) marker.

The actual data being transferred may or may not be JPEG progressive data. For example, the image representation may comprise JPEG progressive data and other auxiliary (and redundant) image data, to be used in order to, for example, efficiently compute downscale versions of the image.

According to a second aspect there is provided a server device comprising means for carrying out the steps of the method as disclosed above and associated with the server device.

According to a third aspect there is provided a storing device comprising means for carrying out the steps of the method as disclosed above and associated with the storing device.

According to a fourth aspect there is provided a computer program product comprising software instructions that when downloaded to a computer is configured to perform a method as disclosed above. The computer program product may be stored on a non-volatile computer-readable storage medium.

The second, third, and fourth aspects may generally have the same features and advantages as the first aspect. Other objectives, features and advantages of the present invention will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail by way of non-limiting examples, reference being made to the enclosed drawings, in which.

DETAILED DESCRIPTION OF PREFERRED EMBODIMENTS

Figure 1:
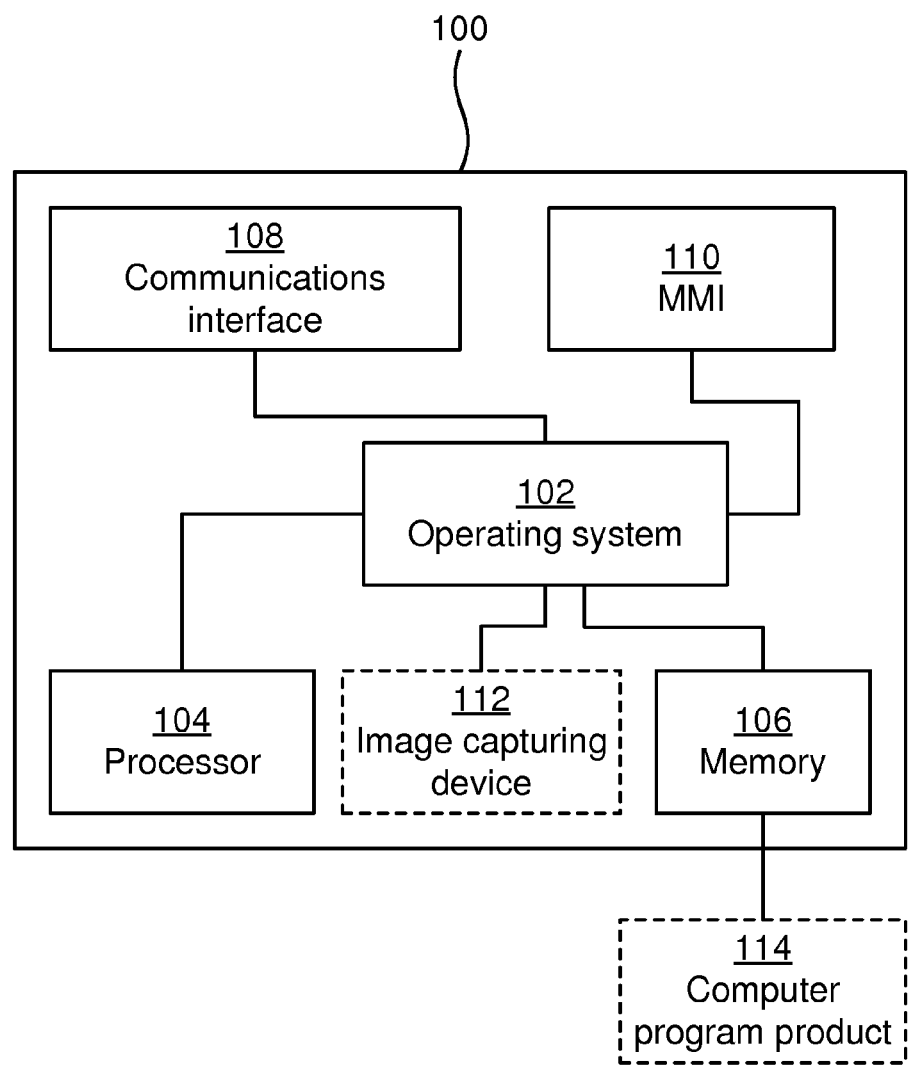
FIG. 1 is schematic illustration of a system according to an embodiment.

The present invention will now be described more fully hereinafter with reference to the accompanying drawings, in which certain embodiments are shown. Like numbers refer to like elements throughout. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

It has been discovered that for an image, which for example has been compressed using the JPEG format, the JPEG progressive format, the SPIHT format, the JPEG2000 format, the WebP format, the JPEG XR format or any similar format and which is to be displayed on a small screen (such as a screen of a mobile phone) usually only requires a subset of the image file to be fetched for a certain target size. The target size is usually dependent on parameters such as the screen size, the web page size on which the image is displayed, and the relative size of the image on the web page. It is often desirable to fetch a set of images (such as an array of images in a digital photo album) as quickly as possible in the resolution required for the particular view.

According to known systems the device requesting the data requests complete image files. It is therefore common that the data of the whole image file (even if the image is compressed using a progressive format) is transmitted before the next transmission of another image can start, or that data for displaying the first image beyond its required resolution is transmitted. However, it has been discovered that it may be desirable to obtain a progressively improving quality of all images in the array of images in parallel, rather than serially improving the quality of one image at the time. As will be further disclosed below this is enabled for example by the proposed throttling process of the transmission of the progressive images, wherein the transmission of a certain image is paused after a required resolution has been transmitted, until all other image transmission requests have been served to their required resolutions. The proposed embodiments thereby enable respective clients to fetch their respective image data in parallel and hence substantially simultaneously. As will be further elucidated below, after the required resolution has been transmitted, all the sessions can continue to transmit the next scan of resolution, pause the sessions where such scan has already been transmitted, until all scans are transmitted, and then transmitting the next scans.

Uploading, Downloading and Synchronization:

The disclosed embodiments are based on progressive and parallel uploading and/or downloading of multimedia content, with interrupt, resume and coalescence capabilities. Particularly, the disclosed embodiments provide a mechanism to upload and/or download multimedia data from a storing device to a receiving device so that the most relevant data is transmitted (i.e. uploaded or downloaded) first and in later refinement stages the less relevant data is transmitted (i.e. uploaded or downloaded). In this way, the receiving device will be able to provide a preview of the multimedia content long before the multimedia content has been completely uploaded or downloaded.

FIG. 1 is a schematic illustration of a client device 100 according to an embodiment. The client device 100 may be a computer. The client device 100 may be a personal digital assistant (PDA). The client device 100 may be a mobile phone. The client device 100 generally comprises circuitry arranged to perform a number of operations and will herein be described in terms of functional blocks. In general, the functional blocks may be implemented in various ways, such as by programming one or more field programmable gate arrays (FPGAs), applications specified integrated circuits (ASICs), or the like.

The client device 100 comprises a processor functional block 104, which may be embodied as a central processing unit (CPU) and/or a dedicated image processing unit, such as a JPEG hardware accelerator. The processor may also refer to a graphics processing unit (GPU), capable of calculations, such as pixel/fragment shaders in OpenGL/OpenCL. The image processing unit may be implemented as a computer program product comprising one or more software components, or as a dedicated hardware unit for image processing. The software components may comprise software instructions that when downloaded to a computer are configured to perform the instructions associated with the processing unit.

The client device 100 further comprises a memory functional block 106, which may be embodied as a memory or a computer-readable storage medium, such as a random access memory (RAM), a read-only memory (ROM), a universal series bus (USB) product, such as a memory stick, or the like.

The client device 100 further comprises a communications functional block 108, which may be embodied as a receiver and a transmitter and/or a transceiver, inter alia configured to receive input from, and deliver output to, a man-machine interface (MMI) 110 functional block, another communications device, a computer, or the like.

The client device 100 is run under supervision of an operating system 102. The client device 100 may further comprise an image capturing device 112, which may be embodied as a digital camera or the like. Alternatively the client device 100 may be operatively coupled to an external image capturing device (not shown) via the communications interface functional block 108.

Figure 2:
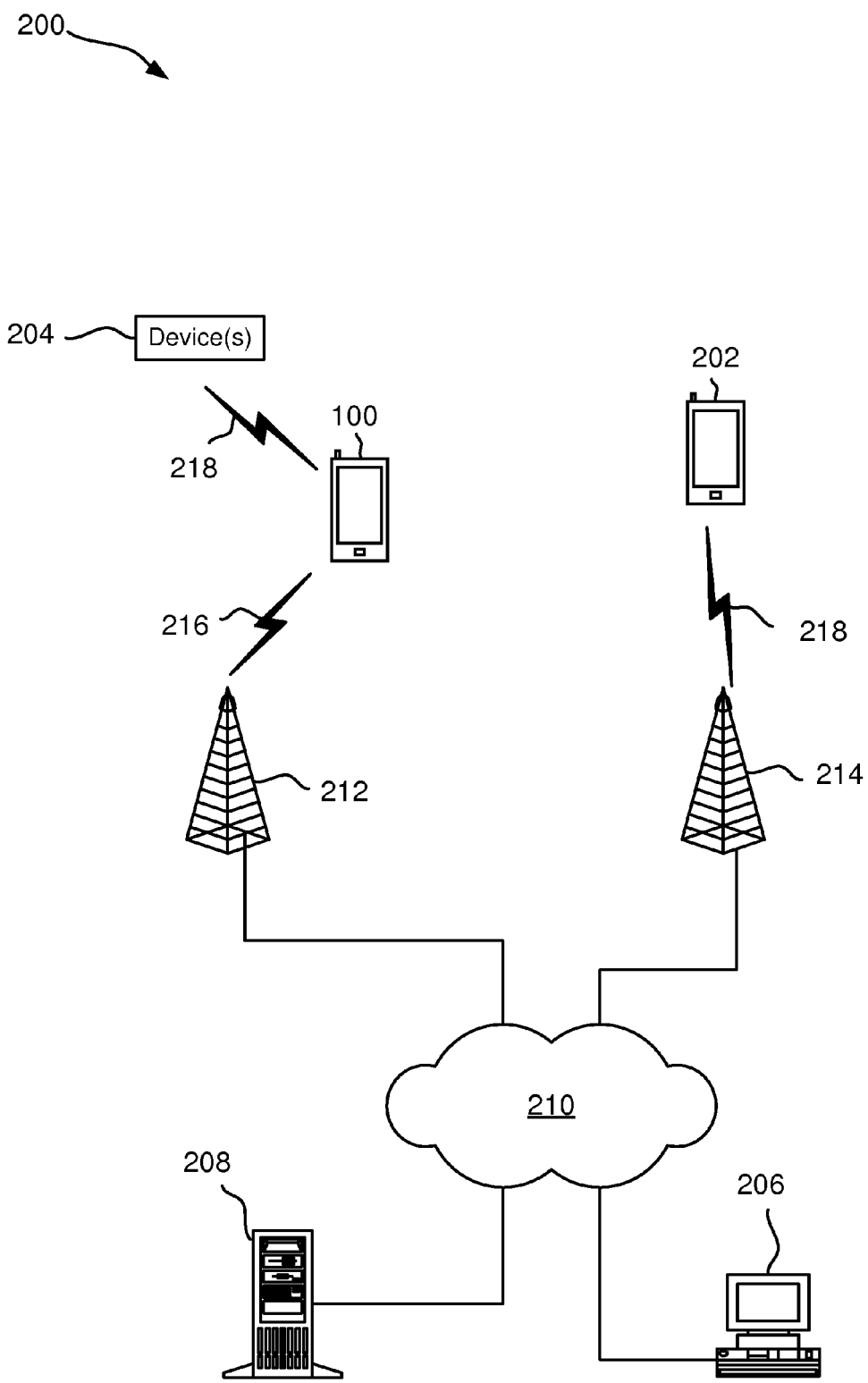
FIG. 2 is schematic illustration of a device according to an embodiment.

FIG. 2 illustrates an example of a communications system 200 in which embodiments of the disclosed subject matter may be applied. In the communications system 200 of FIG. 2, various data services such as cellular voice calls, www/wap browsing, cellular video calls, data calls, facsimile transmissions, music transmissions, still image transmissions, video transmissions, electronic message transmissions, electronic positioning information, multimedia content synchronization, multimedia content uploading and downloading, and electronic commerce may be performed between the client device 100 and other devices, such as one or more further client devices 202, a local device 204, a computer 208, or a server device 206. For different embodiments of the client device 100 and in different situations relating to the operating conditions of the communications system 200, different ones of the data services referred to above may or may not be available.

The client devices 100, 202 are arranged to be operatively connected to a network 210 through radio frequency links 216, 218 via base stations 212, 214. The base stations 212, 214 are operatively connected to the network 210. The network 210 may be in compliance with any commercially available network standard, such as GSM, UMTS, D-AMPS, CDMA2000, FOMA, TD-SCDMA, UDP, TCP, TCP/IP, IPv4, IPv6 and the like.

The network 210 may be an integrated part of the Internet. A server device 208, which may be an Internet server, has a data storage and is operatively connected to the network 210, as is a computer 206. The server device 208 may be part of a computer cloud.

Figure 4:
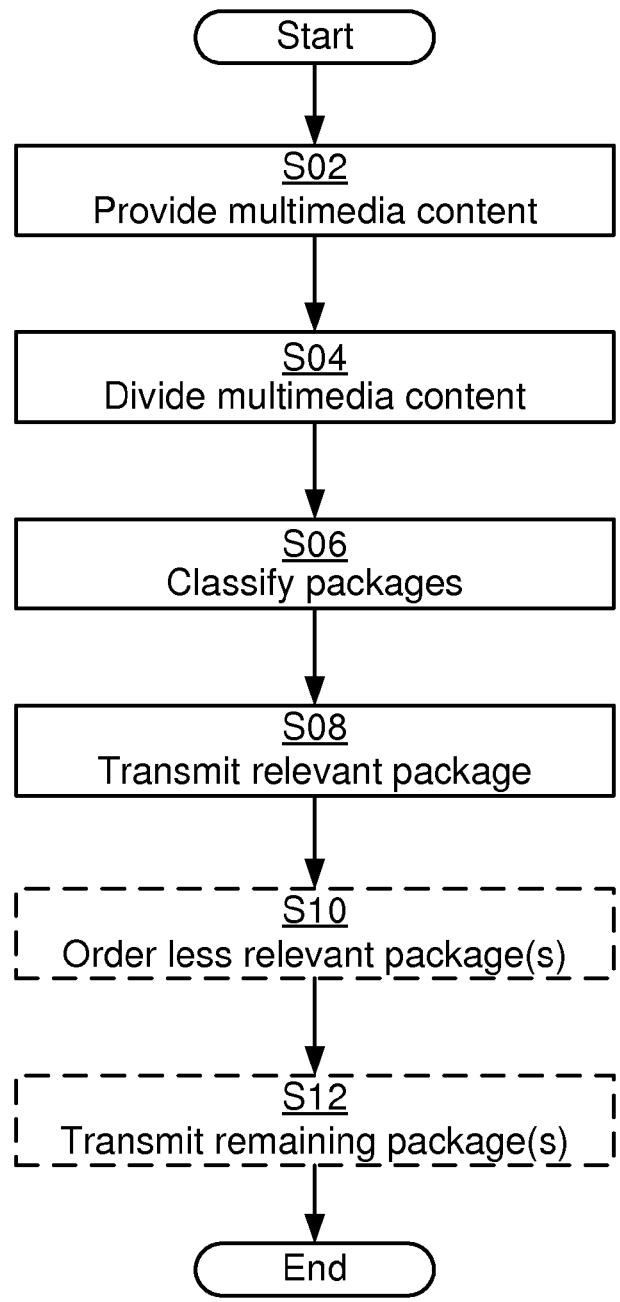
FIG. 4 is a flowchart of methods according to embodiments.

A method for synchronizing multimedia content between a storing device and a receiving device will now be disclosed with references to FIGS. 1 and 2 as well as the flowchart of FIG. 4. The multimedia content may relate to (digitized) images, (digitized) video, (digitized) sound, and the like. The server device 208 may be a member of a network cloud. The client device 100, 102 may be a mobile phone or the like. Typically the client device 100, 102 may, in view of the server device 208, have constrained computational capabilities. Typically the client device 100, 102 is operatively connected to the server device 208 via a narrowband communications channel, such as the links 216, 218, with a data bit rate of less or equal to 1-2 megabit per second.

It should be noted that the storing device and the receiving device are herein defined by the roles of uploading and downloading multimedia content, respectively, but these roles may change in a particular device for a particular application. Thus either of the client device 100, 102 and the server device 208 may selectively act as the receiving device or the storing device. For example, a mobile phone uploading content to a server may take the role as the storing device in respect of the content, while a mobile phone downloading content from a server may take the role as the receiving device in respect of the (same) content. Similarly, a server downloading content from a mobile phone may take the role as receiving device, and a server uploading content to a mobile phone may take the role as storing device.

In a step S02 multimedia content is provided at the storing device. The multimedia content may have been captured by the storing device itself, for example by means 112 such as still image camera circuitry, video camera circuitry and/or microphone circuitry of the storing device.

In a step S04 the multimedia content is divided into at least two packages. Upon division of the multimedia content into at least two packages a list of the packages associated with the multimedia file may be generated.

The list may be updated upon further division of the packages of the multimedia file and/or upon division of another file of multimedia content. The list may thereby provide a (dynamic) overview of all files of multimedia content that have been divided as well as an overview of all packages associated with the file(s) of multimedia content. By accessing the list location information regarding for example a thumbnail version of a full-scale image may be easily retrieved, thus facilitating easy retrieval of the thumbnail version. The list may further also be updated upon transmission of packages from the storing device to the receiving device to facilitate easy tracking and progress information regarding transmitted packages. The list may also be generated based on instructions from the receiving device and/or the storing device. Such instructions may be static or dynamic, and may (or may not) utilize information regarding the actual multimedia content.

Typically the multimedia content is stored as a sequence of frames, where each frame comprises a plurality of information data bits. The information data bits may correspond to an encoded and/or compressed representation of multimedia content. Each package may therefore comprise a plurality of such frames. It may be advantageous that the multimedia content is divided so that an individual frame is not divided.

In a step S06 the at least two packages are classified as a relevant package and (at least) one less relevant package. The classification is determined based on data, such as the information data bits, in the at least two packages and by using a relevance criterion. The relevance criterion may be dependent on the structure of the multimedia content. Thus there may be a set of relevance criteria for each type of multimedia file.

One type of relevance criteria may be the amount of information in the multimedia content. The amount of information may be measured by using an entropy measure, as described in "Elements of Information Theory," 2nd edition, by Cover, T. M. and Thomas, J. A., which is incorporated herein by reference.

Further, a downscaled version of the multimedia content may be regarded as more relevant than a not downscaled version of the same multimedia content. In general, the relevance may thus be proportional to the level of downscaling of the multimedia content. Thus, a downscaled image may be regarded more relevant than a larger image (in terms of the number of bits and/or pixels needed to represent said image). For example, four 64 by 64 pixels images may be regarded as more relevant, than one 128 by 128 pixels image. Thus transmitting (small) thumbnail images may have a higher priority than transmitting additional data (such as progressive refinement scans) to construct a higher quality image.

The relevance criteria may also be associated with the amount of times a particular multimedia content has been accessed (both on the receiving device and/or on the storing device), for example how many times an image in an album of images has been viewed. The storing and/or receiving device(s) may therefore comprise counter circuitry arranged to count how many times a particular multimedia content has been accessed, viewed and/or transmitted. The relevance may thus be proportional to the number of times the multimedia content has been accessed. Such an album of images may, for example, be stored in the memory 106 of the client device 100, 102, in the server 208, in the computer, 206, in the additional device(s) 204. Further, when synchronizing multimedia content between a receiving device and a storing device, the relevance should count in a similar way thereby making the client-server synchronization, and the server-client synchronization essentially symmetric problems.

Further relevance criteria may relate to in which resolution the multimedia content been accessed (high relevance if accessed, low relevance if not accessed), if image based multimedia content has been zoomed upon (high relevance if zoomed upon, low relevance if not zoomed upon), if image based multimedia content has been a subject and a result of a search (high relevance if searched, low relevance if not searched), if the multimedia content has been requested or shared via applications such as MMS, email, digital social media applications, and the like (high relevance if requested, low relevance if not requested).

The relevance criteria may also relate to properties, or handling, of the user interface of the device on which the multimedia content is to be presented. For example, if the multimedia content is represented by icons (such as thumbnail images) displayed on the user interface, the user interface may be arranged to perform scrolling actions whereby a currently displayed first set of icons is replaced by a second set of displayed icons (the second set may partly overlap the first set) upon reception of user interaction in form of a scrolling action. The relevance criteria may for such a user interface be related to the speed of scrolling (i.e. the speed of which the first subset is replaced with the second subset on the user interface). For a low scrolling speed the multimedia content associated with the currently displayed first set of icons is given a high relevance score and the multimedia content associated with the not currently displayed second set of icons is given a relevance score lower than the high relevance score. For a scrolling speed being higher than the low scrolling speed the relevance score may be equal for the entire set of multimedia content. The relevance criteria may thus be dependent on grouping, ordering, or spatial relations of the multimedia content. For example, the relevance criteria may further be given as a function of the distance for a particular icon to the currently displayed first set of icons; the further the distance the lower the relevance for the particular icon. Hence the relevance score for the entire set of multimedia content may be dependent on the currently displayed, or accessed, multimedia content.

The properties may also be dependent on user interaction with the user interface. For example, a first user may have a tendency to often perform a slow scrolling speed when accessing a set of multimedia content whereas a second user accessing the same multimedia content may have a tendency to often perform scrolling with a higher speed than the low speed when accessing the same set of multimedia content. Behavior of such user interaction may be stored as user interaction patterns. One or more user profiles with information relating to user interaction patterns may therefore be stored in the memory 106 of the client device 100, 102, in the server 208 and/or in the computer 206. An example of a user pattern is how often a particular user performs a zoom-in operation on images representing the multimedia content. Thus, although a particular image may be associated with a small number of average zoom-in operations (and hence may be regarded as less relevant according to the above disclosure regarding zooming), the particular image may achieve a higher relevance score if also information regarding the particular user manipulating the particular image is taken into account.

Relevance criteria based on grouping, ordering, or spatial relations of the multimedia content may as such be independent of whether or not the multimedia content is displayed on a user interface. Grouping, ordering, or spatial relations may also be based on relations between files of multimedia content based on time and/or place of capture of the files of multimedia content. For example, in case a first file of multimedia content captured a certain time and/or place is given a certain relevance score, a second file of multimedia content captured within a predetermined distance in time and/or place from the certain time and/or place, the second file of multimedia content may inherent the certain relevance score of the first file of multimedia content. Thereby the transmission of different packages of the first file of multimedia content and the second file of multimedia content may be synchronized. The predetermined distance in time may for example be one minute, one hour or during the same calendar day, and the predetermined distance in place may be 10 meters, 100 meters or 1000 meters.

Hence, in view of the foregoing the relevance score may change dynamically depending on, for example, which set of multimedia content that is currently displayed, accessed, and/or transmitted. The relevance criteria may also be dynamically modified depending on, for example, different user patterns and/or transmission properties relating to the communications network over which the files of multimedia content are transmitted. For example, upon user access of a first file of multimedia content (such as viewing an image file) in a particular folder (where the image file is part of a particular album), other files of multimedia content in the same folder may have their relevance score increased. Similarly, the relevance score of said other files of multimedia content in the same folder may be decreased upon detection that the user has ceased to access the first file of multimedia content. The relevance criteria for a single package may also be increased upon detection by the communications network of a packet loss concerning the package.

Further, the relevance may depend on the luminance of image based multimedia content (high relevance if "light" image, low relevance if "dark" image), the date the multimedia content was generated and/or last accessed (the more recently the multimedia content was generated and/or accessed the higher the relevance), the number of persons portrayed in image based multimedia content (the more persons the higher the relevance), the number and/or type of metadata, such as Exif data, associated with the multimedia content (the more metadata—or metadata of a certain type—the higher the relevance), similarities between to a previously transmitted multimedia content (the higher the similarity the higher the relevance). In view of the foregoing the relevance may be further differentiated into a number of intermediate relevance levels (from high relevance to low relevance) depending on the amount of zoom, the number of searches, the number of requests, the number of persons in the image, the number of metadata, and so on. The relevance criteria may be equally applied to different files of multimedia content so as to prioritize not only packages within a particular file of multimedia content but also to prioritize one file of multimedia content over another file of multimedia content.

It may thus be possible to find an expression that generates a relevance score for a particular multimedia content, or an image fragment, and which determines the number of packages to be transmitted for said particular multimedia content.

Consider the following non-limiting example. According to this example the multimedia content represents image data. Assume that the multimedia content has been divided as follows: "Package 1" represents thumbnail images of dimension 16 by 16 pixels. "Package 2" represents thumbnail images of dimension 64 by 64 pixels. "Package 3"-"Package 6" represent progressive image data up to dimensions corresponding to a screen size of the receiving device. "Package 7"-"Package 8" represent progressive image data up to dimensions corresponding to a full size version of the image data.

Assume further that transmission of the packages should follow the following packaging rules in order of execution: all packages should be packaged in prioritized multimedia file order, and the prioritized multimedia files should be transmitted up to "Package 5", one multimedia file at the time, and starting from the package associated with the most prioritized multimedia file. Further, if no urgent need for critical packages exists transfer "Package 6" and "Package 7" in multimedia file relevancy order, otherwise transfer only "Package 6". Never transfer "Package 8" if not explicitly requested.

A possible relevance criteria per multimedia file and package for achieving the above objective may thus be formulated as follows. The (global) relevance score, or scoring function, can, for example, be expressed as Total_score=file_score+package_score, where "Package 1"—"Package 8" have the following package_scores:
"Package 1": 10.000.000.000
"Package 2": 9.000.000.000
"Package 3": 8.000.000.000
"Package 4": 8.000.000.001
"Package 5": 8.000.000.002
"Package 6": 8.000.000.003
"Package 7": 7.000.000.000
"Package 8": 6.000.000.000, and where the file_score for each file is the relevant priority with regards to the other files multiplied with 10 (and where the maximum priority is less than 10.000.000). In other words, a package with a high priority is given a high score. As the skilled person understands there are different ways of dividing the multimedia content, and there may be different packaging rules, and scoring functions that are equally possible within the scope of the disclosed subject matter.

For example, assume that two files "File 1" and "File 2" of multimedia content are provided with file_scores as follows: "File 1": 540, and "File 2": 650. Then the parameter total_score for each package for "File 1" and "File 2" would be:
"Package 1:1": 10.000.000.540
"Package 1:2": 9.000.000.540
"Package 1:3": 8.000.000.540
"Package 1:4": 8.000.000.541
"Package 1:5": 8.000.000.542
"Package 1:6": 8.000.000.543
"Package 1:7": 7.000.000.540
"Package 1:8": 6.000.000.540
"Package 2:1": 10.000.000.650
"Package 2:2": 9.000.000.650
"Package 2:3": 8.000.000.650
"Package 2:4": 8.000.000.651
"Package 2:5": 8.000.000.652
"Package 2:6": 8.000.000.653
"Package 2:7": 7.000.000.650
"Package 2:8": 6.000.000.650 where "Package j:k" is package number k of file number j. Thus arranging all packages in descending relevance would give the following packaging ordering:
1) "Package 2:1"
2) "Package 1:1"
3) "Package 2:2"
4) "Package 1:2"
...
16) "Package 1:8".

As a result thereof said particular multimedia content may be transmitted at low resolution, at mid resolution, or at high resolution. Due to the progressive nature of the storage format of the multimedia content it may be possible to, by transmitting more packages, increase the resolution of said particular multimedia content from low to mid and from mid to high.

In a step S08 the relevant package is transmitted from the storing device to the receiving device. Thus multimedia content is uploaded/downloaded from a storing device to a receiving device in such a way that the multimedia content is uploaded progressively and in parallel instead of in series. The receiving device thereby receives the relevant package. The relevant package may then be stored by the receiving device. As will be further described below the content of the package may then be accessed by the receiving device, for example by unpacking, decoding, and/or decompressing the package. In order to do so the receiving device may access auxiliary data, such as header or marker information as disclosed herein. However, it is equally possible that the receiving device is enabled to access the package(s) without such auxiliary data. Header and/or marker information may also enable packages to be transmitted from the storing device to the receiving device on a specific transmission channel, where the transmission channel is specified by the header and/or marker information. For example, the packages may be transmitted on two or more parallel TCP channels (or streams). This may enable packages with high relevance scores to be transmitted on transmission channels with high transmission rates (and/or costs), whilst packages with relevance scores being lower than the high relevance scores are transmitted on transmission channels with lower transmission rates (and/or costs) than the high transmission rates. This may in turn allow for parallel transmission of different packages utilizing different transmission channels for different packages. Examples of different transmission channels are disclosed in connection with FIG. 2.

The header may include information regarding the existence of markers. Thus, upon decoding of the package containing the header, the receiving device is able to firstly identify whether or not markers are used, and secondly to identify the structure of the markers used. Examples of structures for different markers will be provided below. Header information may also be provided in sub-headers. The sub-header may provide information regarding the content of the package, coding of the package, compression of the package, encryption of the package, and/or location of the content in relation to the (complete) file of multimedia content. Each package may have its own sub-header. Alternatively, each collection of packages representing the same type of content may have a common sub-header. The content may relate to a common scan of a plurality of JPEG images. In terms of information regarding compression of the packages, markers and/or sub-headers may provide information regarding compression parameters. This enables the compression parameters to be dynamically changed from a first group of packages to a second group of packages to a third group of packages, and so on. Each group of packages may include one single package. The markers and/or sub-headers may for example provide information relating to the compression/quantization tables used in a compression/quantization scheme for the group of packages. For example, information relating to which compression/quantization tables that are used could advantageously be provided in a header that is common for the whole file of multimedia content, whilst information relating to which one of these compression/quantization tables that are used for a specific group of packages is provided in sub-headers (or markers) for said specific group of packages. Further information that may be included in the header or sub-header will be disclosed below.

When transmitting the multimedia content (in any direction) it may be advantageous to group a number of elements of similar relevance in packets and/or packages in order to use less overhead bits during transmission. Such grouping of elements may require parallel computations using multiple processor cores, or CPUs.

As noted above it may be advantageous that firstly the multimedia data that makes a larger impact in the subjective perceived quality is uploaded. Successively the remaining parts that are less important may be uploaded by means of additional packages. In a step S10 the relevance criterion may therefore be used to order the at least one less relevant package in descending relevance. In practical circumstances there may be a plurality of less relevant packages. Thus, the multimedia content may first be divided into one relevant package and one less relevant package and then the less relevant package may in turn be divided into one relevant package (of the original one less relevant package) and one less relevant package (of the original one less relevant package).

Further, in a step S12 the remaining of the at least one less relevant package may then be transmitted from the storing device to the receiving device according to this ordering. Upon the reception of the remaining at least one less relevant package the receiving device may by unpacking, decoding, and/or decompressing all received packages assemble all received packages into one or more multimedia files. The granularity of the upload operation may be limited by the transport container used for the uploading and server storage. Upon reception of the last package the receiving device may be arranged to transmit an acknowledgement message to the storing device that a complete file of multimedia content has been received and stored, so that the storing device can release that file, and set the priority of the transmitted complete packages to zero. Correspondingly, if a package is lost, the package may be resend increasing the associated priority, for example by dynamically increasing the relevance score.

The uploading and/or downloading processes may generally have a set of rules according to which transmissions are conducted. Such rules can depend on the type of connection, the cost of transmission, and the battery life (or charging) of a portable device taking part in the uploading and/or downloading processes. Such rules may determine when, what, and how much of the information bits that may be transmitted.

In case the multimedia content represents two or more individual multimedia content files it may be advantageous that the important part(s) of each multimedia content file is uploaded before any less important part is uploaded. Particularly, when the multimedia content represent at least two multimedia files and when the at least two multimedia files each are divided and classified into a respective relevant package and at least one less relevant package, each one of the relevant packages may be transmitted in said step S12 before any of the at least one less relevant packages is transmitted.

Further, it can happen that an uploading/downloading process needs to be interrupted. Before the uploading/downloading process is resumed it can happen that new multimedia content that also need to be uploaded or downloaded is provided at the storing device. Thus, the multimedia content may represent a first and a second multimedia file and the first and second multimedia files are each divided and classified into a respective relevant package and at least one less relevant package. In such a case when the second of the first and second multimedia files is provided after at least one of the at least one less relevant package of the first multimedia file has been transmitted, the relevant package of the second multimedia file may be transmitted in said step S14 before the remaining of the at least one less relevant package of the first multimedia file is transmitted.

The uploaded/downloaded content may have to be transcoded to an intermediate format to facilitate fast access by the rest of the devices in the system. Such an intermediate format may change over time depending on the amount of available content.

The storing device may need to transcode the data of the multimedia content to a progressive stream (for example from baseline JPEG data to progressive JPEG data or transcoding between other formats, such as JPEG2000, WebP, and JPEG XR). This can be performed efficiently with a suitable transcoder (such as a JPEG progressive transcoder), for example implemented in the processing unit 104. For instance, for images a progressive format using spectral selection without successive refinement may be suitable. Alternatively, the storing device may in advance prepare independent versions of the files of multimedia content with different resolutions (such as images of pixel dimensions 16 by 16, 64 by 64, 256 by 256, 1024 by 1024, 4096 by 4094 pixels), and where the files of multimedia content then are transmitted in order from lowest resolution to highest resolution. In such a case all files except the file with lowest resolution comprise redundant data in comparison to previously transmitted files.

Further, also in the context of images, scans may be used so that proper power of 2 downscales of the original image can be generated. All DC coefficients may be transmitted before all AC coefficients are transmitted. Further, all the luminance AC coefficients may be transmitted before the chrominance AC coefficients are transmitted. Also, further compression may be added to the scans that are to be transmitted, depending on the desired quality of the transmission. There may thus be different ways of rendering the received packages, independently of whether or not the packages represent image data.

According to a first general example the lengths of the packages in a frame that is to be read is first accessed. This information may be found in the herein disclosed auxiliary data (for example in header or marker information). The first package according to the first length information is then read (where the first length information corresponds to the length of the first package). The first package is then decoded and/or decompressed. The data of the first package may then be filtered (this may involve one or more scaling and/or smoothening operations). The data of the (filtered) first package may then be displayed at the receiver device. The second package according to the second length information is then read (where the second length information corresponds to the length of the second package). This may occur while decoding, decompressing, filtering and/or displaying the first package. The second package is then decoded and/or decompressed. This may occur while filtering and/or displaying the first package. The data of the first package may then be filtered (this may involve one or more scaling and/or smoothening operations). This may occur while displaying the first package. The data of the (filtered) second package may then be displayed at the receiver device, and so on for the remaining received packages.

According to a second general example a stream of packages is continuously read. Upon detection that a package has been read, for example by using a list of package lengths or positions, or markers, or by the packages having predetermined lengths (which may be comprised in the herein disclosed auxiliary data each read package may be decoded, decompressed, filtered and/or displayed.

For both the first general example and the second general example the packages may include data from more than one individual file of multimedia content. The displaying of the data may include displaying of the individual file of multimedia content on different positions on the screen of the receiving device.

According to the above the receiving device will keep incomplete versions of the multimedia content (such as an incomplete JPEG progressive image), alternatively with extra metadata associated therewith. One reason for using progressive formats for multimedia content is that it may be straightforward to append incoming data. For example, metadata may be included for providing information where in the stream of packages the current package is positioned. Such metadata may comprise a coefficient index and a macro block or data unit index. With such a coefficient index and macro block or data unit index information relating to how much information of the original multimedia file that has been transferred is available. These two parameters could also be used to give a progress estimate, instead of relying on the file size of the multimedia content to be transferred, since the file size itself does not convey information regarding how much data of the original multimedia file that has actually being transferred. It is also possible to append a tail at the end of the packages of the multimedia file, to make the original multimedia file progressive, so that it can be opened with any application allowing progressive file formats. Further, if the uploading/downloading process is interrupted, the receiving device and/or the storing device may append such a tail that makes the multimedia content conform with the file format of the multimedia content. For example, the receiving device may store metadata related to where in the multimedia file the stream has stopped, so that it can be resumed in the future.

Keeping the progressively decodable versions of the multimedia content at the receiving device, as well as the requirement of being able to deliver thumbnails of any size may require additional consideration. Particularly, after the multimedia content have been uploaded to the receiving device, the multimedia content may be requested by another receiving device to be downloaded in requested dimensions. The receiving device may therefore keep static redundant data, so that the system can scale well to any kind of receiving devices. The server device 208 may therefore be arranged to deliver a downscaled version of the stored multimedia content in real time, so called live downscaling. This is also known as on demand scaling. In order to be successful in this regard, the downscaling must be so efficient that the overhead is negligible. In order to achieve this multi-core technology may be exploited to perform the operations involved for the downscaling.

Figure 3:
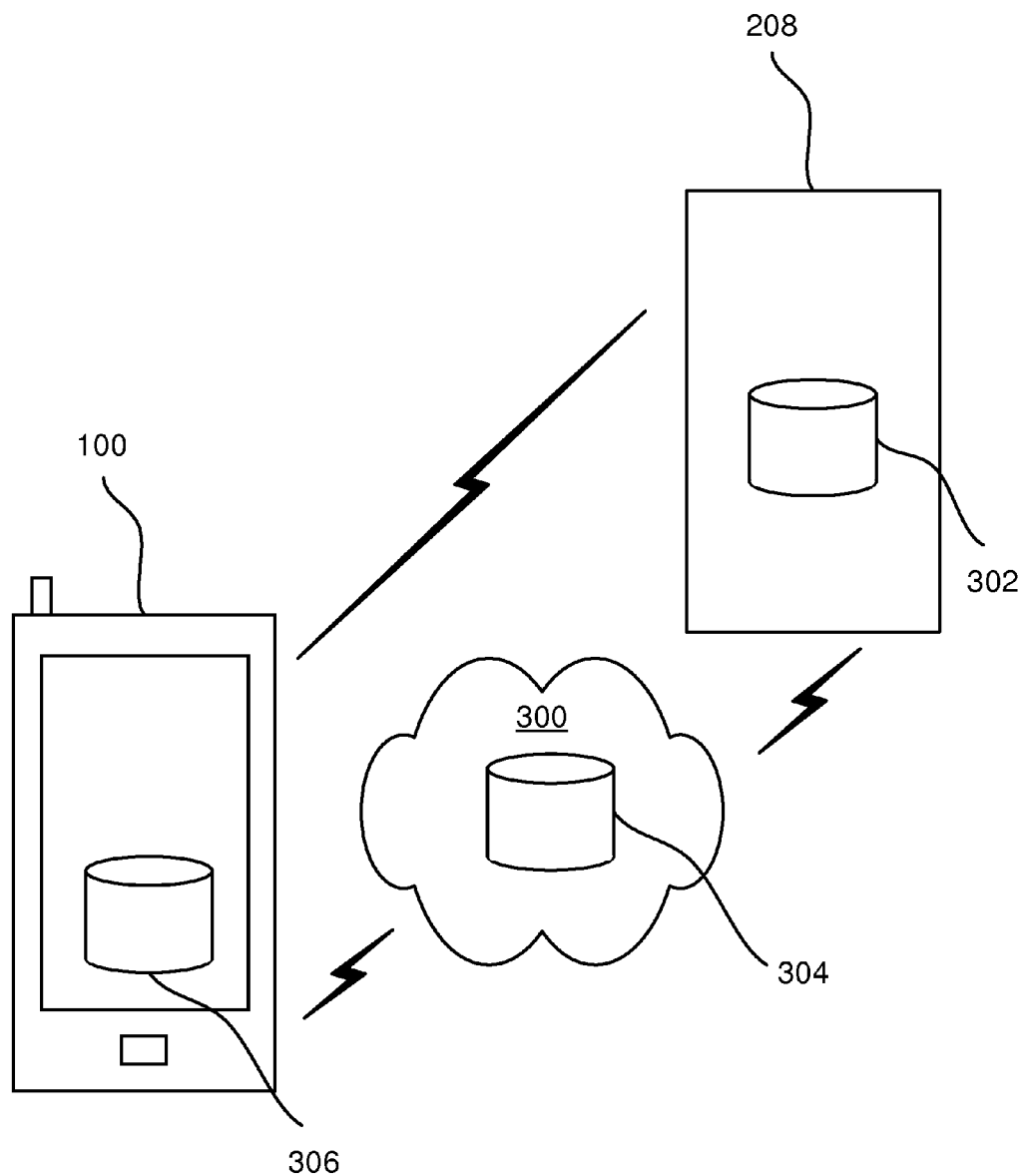
FIG. 3 is schematic illustration of a system according to an embodiment.

The above disclosed operations may require fast manipulation, such as random access capability, of the multimedia content. In order to further facilitate this different cache levels may be used. FIG. 3 illustrates a communications system comprising a client device 100, a server device 208 and a content delivery network 300. The content delivery network 300 may be part of the network 210 of the communications system 200 of FIG. 2. At least one local cache 302 may be provided in the server device 208; there may also be at least one cache 304 in a content delivery network 210 service as well as at least one cache 306 provided in the client device 100 itself. In order to enable random access, the multimedia content may be analyzed and features facilitating fast manipulation of the multimedia content is stored in the (respective) multimedia content file(s), temporarily stored in the cache memory, or stored as an entry in a database, the entry in a database may refer to the multimedia content file.

When performing live operations such as scaling or manipulation of images on multiple processor cores or CPUs, it is desirable that the server park managing the operation has enough capacity to keep the incoming queue of data to be operated on to a minimum. That requires over-capacity, because of the nature of the incoming requests is likely not continuous but rather has other statistic properties. Therefore it is desired that the system enabling the live services is also configured to perform other less prioritized tasks which can be paused at any time, so that such over-capacity is properly utilized. Such task may included, but not be limited to, further image optimization operations relating to size or quality, or image analysis for meta data extraction for enabling efficient categorization, tagging and/or search for the images.

To further facilitate the transmission the progressive format may include header information which provides information, such as an index, regarding the positions of the starting bit for one or more progressive refinement scans. The one or more progressive refinement scans are typically regarded as less relevant packages. This header information is preferably only present in the first transmitted package. Thus, from the header alone information is provided relating to the structure of the progressive refinement scans. Thereby any progressive refinement scan may be easily accessed. The header information may include pointers to DC coefficients of all image blocks, thereby enabling a thumbnail image to be generated. Alternatively the header information may include the DC coefficients themselves. Likewise the header information may include pointers to at least a first AC coefficient of the image blocks. Such header information may be utilized in the above described process of throttling in order to decide where a scan to be transmitted starts and ends (i.e. without the need to analyze the entire file).

A series of methods for analyzing, extracting and storing such features relating to an image is described in the patent applications WO 2005/050567, SE0303085-5 and SE0303204-2 by Scalado AB, which are incorporated in full herein by reference. In order to extract the features facilitating fast manipulation of an image, the features may either be extracted during compression of the source and/or target image(s) or the features may be extracted during a post compression analysis of a compressed image. In case multimedia content is compressed using baseline JPEG compression, or a similar compression method such as progressive JPEG compression, the features facilitating fast manipulation of an image retrieved and stored may be any single one of or any combination of indicators to minimum coded units (MCUs), an MCU being a small image blocks of the image, indicators to one or a plurality of data units (DUs), a data unit being a data block representing one channel or color component of the MCU, one or a plurality absolute or relative DC-coefficients of one or a plurality of the color components of the retrieved MCUs and/or of the retrieved data units, number of bits of one or a plurality of the data units (so-called DU-lengths), or number of bits between data units, or between specific coefficients of the data units. As features need to be extracted and/or analyzed in various scales, such techniques can be used to perform such extraction of data efficiently.

As noted above, one or more markers (herein denoted by the letter M) could be introduced in the encoded bitstream to facilitate access to a particular transmission frame of bits, MCU or the like. The marker M could be a JPEG marker with a known padding pattern followed by the sequence FF (where FF is in hexadecimal notation) and a byte that is not equal to 00 (in hexadecimal notation) and where the padding pattern uniquely determines the number of padding bits (i.e. where the number of padding bits can be uniquely determined by observing the byte before the sequence FF).

Provided that the files of multimedia content to be transmitted represent JPEG images and that the JPEG compression scheme for the files utilizes Identical Huffman tables and quantization tables, a marker M in the form FFxx (where xx are bytes not identical to zero) may have the following structure:

<padding of the bitstream with a single zero bit followed by one bits until aligned with byte boundary>
<padding of the bitstream with one bits until aligned with the next byte boundary>
<padding of the bitstream with additional one one bit, or a sequence of bits that are not all zeros>

Thus in binary notation this may be formulated as:

```
xxxxxxx0 | 11111111 | 1xxxxxxx
xxxxxx01 | 11111111 | 1xxxxxxx
xxxxx011 | 11111111 | 1xxxxxxx
xxxx0111 | 11111111 | 1xxxxxxx
xxx01111 | 11111111 | 1xxxxxxx
xx011111 | 11111111 | 1xxxxxxx
x0111111 | 11111111 | 1xxxxxxx
01111111 | 11111111 | 1xxxxxxx
``` for a byte with eight bits, where "|" represents the byte boundary and where each x represents a data bit which could be either 0 or 1. This differs from the default marker in JPEG which is FF00. A marker M in the form 00xx may have the following structure:

<padding of the bitstream with a single one bit followed by zero bits until aligned with byte boundary>
<padding of the bitstream with zero bits until aligned with next byte boundary>
<padding of the bitstream with additional one zero bit, or a sequence of bits that are not all ones>

Thus, in binary notation:

```
xxxxxxx1 | 00000000 | 0xxxxxxx
xxxxxx10 | 00000000 | 0xxxxxxx
xxxxx100 | 00000000 | 0xxxxxxx
xxxx1000 | 00000000 | 0xxxxxxx
xxx10000 | 00000000 | 0xxxxxxx
xx100000 | 00000000 | 0xxxxxxx
x1000000 | 00000000 | 0xxxxxxx
10000000 | 00000000 | 0xxxxxxx
```

In addition, markers in the form FFxx (or 00xx) can be used for purposes of encoding additional data (i.e. an auxiliary information sequence) into the bitstream in a predetermined number of bits following the marker. For example, the following structures (in binary notation) allow information to be coded into three bits yyy (where yyy is not equal to 000):

```
xxxxxxx0 | 11111111 | yyyxxxxx
xxxxxx01 | 11111111 | yyyxxxxx
xxxxx011 | 11111111 | yyyxxxxx
xxxx0111 | 11111111 | yyyxxxxx
xxx01111 | 11111111 | yyyxxxxx
xx011111 | 11111111 | yyyxxxxx
x0111111 | 11111111 | yyyxxxxx
01111111 | 11111111 | yyyxxxxx
``` or (with yyy not being equal to 111, i.e. where at least one of the predetermined bits yyy is equal to one)

```
xxxxxxx1 | 00000000 | yyyxxxxx
xxxxxx10 | 00000000 | yyyxxxxx
xxxxx100 | 00000000 | yyyxxxxx
xxxx1000 | 00000000 | yyyxxxxx
xxx10000 | 00000000 | yyyxxxxx
xx100000 | 00000000 | yyyxxxxx
x1000000 | 00000000 | yyyxxxxx
10000000 | 00000000 | yyyxxxxx
``` respectively. As the skilled person understand the length of the sequence yyy is not constrained to three bits and may be chosen differently. The bit sequence yyy could be indicative of the number of bytes following the marker that are needed in order to render a part of an image on a display. It could also indicate the number of bits (or bytes) to the next or previous marker.

The structure of the marker M could also be reversed, thereby forming markers in the form xxFF, or xx00 (where xx are bytes not identical to zero). One example is a marker M having the following structure:

<padding of the bitstream with a single one bit>
<padding of the bitstream with zero bits until aligned with byte boundary>
<padding of the bitstream with one bits until aligned with next byte boundary>

```
xxxxxxx1 | 11111111 | xxxxxxxx
xxxxxx10 | 11111111 | xxxxxxxx
xxxxx100 | 11111111 | xxxxxxxx
xxxx1000 | 11111111 | xxxxxxxx
xxx10000 | 11111111 | xxxxxxxx
xx100000 | 11111111 | xxxxxxxx
x1000000 | 11111111 | xxxxxxxx
10000000 | 11111111 | xxxxxxxx
```

The marker thus becomes xxFF where xx are bytes not identical to zero.

It may be required that so-called non-markers also are inserted into the bitstream representing the multimedia content in cases where the bitstream comprises an already existing sequence being equal to the predetermined sequence of bits following the byte of the padding pattern so as to distinguish "naturally occurring" sequences of markers from "true" markers. The "naturally occurring" sequences of markers may be marked by a non-marker. The non-marker for the present example thus becomes 00FF. Thus, 00 should be inserted before each naturally occurring sequences of FF. In a JPEG context markers in the form xxFF may require occurrences of FF00 in the bitstream to be switched to 00FF prior to introducing the marker M.

If a different non-marker is user, for example FFFF, i.e. for naturally occurring FF, a FF is inserted before the FF. Thus, another example of a marker is:

```
xxxxxxx0 | 11111111 | xxxxxxxx
xxxxxx01 | 11111111 | xxxxxxxx
xxxxx011 | 11111111 | xxxxxxxx
xxxx0111 | 11111111 | xxxxxxxx
xxx01111 | 11111111 | xxxxxxxx
xx011111 | 11111111 | xxxxxxxx
x0111111 | 11111111 | xxxxxxxx
01111111 | 11111111 | xxxxxxxx
```

An alternative marker can be formed by inverting the ones to zeros (and vice versa), to form a marker of type xx00 (where 0000 is a non-marker):

```
xxxxxxx1 | 00000000 | xxxxxxxx
xxxxxx10 | 00000000 | xxxxxxxx
xxxxx100 | 00000000 | xxxxxxxx
xxxx1000 | 00000000 | xxxxxxxx
xxx10000 | 00000000 | xxxxxxxx
xx100000 | 00000000 | xxxxxxxx
x1000000 | 00000000 | xxxxxxxx
10000000 | 00000000 | xxxxxxxx
```

The symmetry of zeros and ones is understood from the marker structures provided above, and from the above a person skilled in the art is able to form similar markers. The skilled person also understands that although the markers disclosed above contain in a byte directly following the byte comprising the padding pattern a sequence of all-zero bits or all-one bits, this byte may comprise any predetermined sequence of bits. For example, for a "byte-size" of 5 bits, instead of containing 00000 or 11111 this byte may comprise the predetermined sequence 10110 or the like. It is thus also understood that the "byte-size" does not have to be 8 bits, but could be smaller or larger. For example, a "byte-size" of 3-bits could be used, where the non-marker would be 0001111 and the marker has the following structure:

```
xxxxxxx1 | 111 | xxxxxxxx
xxxxxx10 | 111 | xxxxxxxx
xxxxx100 | 111 | xxxxxxxx
```

An even more general marker could have one of the following structures: either <arbitrary padding>M<a bit sequence describing the amount of padding, being not all zeros> where M preferably is FF in hexadecimal notation, or <arbitrary padding>M<a bit sequence describing the amount of padding, being not all ones> where M preferably is 00 in hexadecimal notation. Next follows examples of markers having these structures. For all examples the arbitrary padding is 100100 (in binary notation). According to a first example the bit sequence describing the amount of padding describes the complete padding pattern:
 . . . |xx100100|11111111|"complete padding pattern is 10100100" xx| . . . .
According to a second example of these types of markers the bit sequence describing the amount of padding describes the preceding padding:
 . . . |xx100100|11111111| "current padding is 100100" xx| . . . .
According to a third example of these types of markers the bit sequence describing the amount of padding describes the number of bits in the preceding padding:
 . . . |xx100100|11111111| "current padding is 6 bits" xx| . . .
According to a fourth example of these types of markers the bit sequence describing the amount of padding is void (and xxxxxxxx is not equal to 00 in hexadecimal form):
 . . . |xx100100|11111111|xxxxxxxx| . . . .
For the fourth example it may or may not be possible to correctly decode the bits preceding the marker (in this case the marker is FF in hexadecimal notation). This depends on the actual compression scheme used. This type of marker may thus be advantageous in situations where the bits preceding the marker represents data of low importance, such as least significant bits and/or AC coefficients in a JPEG context.

The above disclosed markers can be used in a bitstream in which images "Image 1" and "Image 2" have been encoded according to the following illustrative example, where scans (i.e. bits representing increasing resolution information, such as higher frequencies) from at least two images can be interleaved in an efficient way, proceeding with next scans, and so on, thereby allowing the receiving device to send the individual images to separate streams (resulting in files or input to decoders, etc.) without having to understand the packaging or compression of the individual images itself.

Example: <bits representing DC values for "Image 1" of 320 by 240 pixels>M<bits representing DC values for "Image 2" of 256 by 256 pixels>M< . . . >M<bits representing first and second AC values for "Image 1" of 320 by 240 pixels>M<bits representing first and second AC values for "Image 2" of 256 by 256 pixels>M< . . . >M<bits representing third to fifth AC values for "Image 1" of 320 by 240 pixels>M<bits representing third to fifth AC values for "Image 2" of 256 by 256 pixels>M< . . . >M.

The receiving device knows that three images are being transmitted. It receives the stream and associates it with a first stream until identification of the first marker. By analyzing the padding around the marker, the receiving device is able to determine how many bits that should be removed from the received bitstream, as the padding is not part of the data itself. The receiving device is then able to associate the next bits with the second stream, until identification of the second marker, and in a similar way determine how many bits it should remove from the received bitstream. This procedure is repeated until the third marker is received. After the third marker, the bits following the third marker can be appended to the first stream, and the procedure can be repeated until all data has been received. Once a marker has been received, a signal can also be transmitted to another subsystem informing that a new complete set of information has been received. In such way the subsystem may, for instance, inform the displaying subsystem that it may re-render one of the images, with slightly higher quality data in comparison to the data that is currently displayed.

The determining of the padding can be accomplished by performing a lookup in a lookup table where all combinations of the padding patterns have been precalculated, resulting in a number of bits for any lookup of the size of the used "byte size" (such as 8-bit, 16-bit, 4-bit, 7-bit, etc.). Another way of determining the padding is to analyze at the bit pattern of the padding itself, counting leading or trailing zeros or ones until a one or zero is encountered, depending on the type of marker.

Although the above markers have been disclosed in an image compression context, markers generally allow a separation of content of a general file having a general file format so that the content of the file can be split into separate files. A necessary and sufficient condition of the marker may be that the introduction of one or more markers (and non-markers) in the bitstream of a file does not corrupt decoding of the file represented by the bitstream. Although advantageous, it may not be necessary that the marker is further based on the actual content of the file to be split (or the actual file type of the file).

Further, it may, for example, be desirable to perform zoom and pan operations on images stored on the server device. In order to provide this without requiring the complete full-size image to be downloaded to the client device, the client device may request image tiles of a certain size and scale factor to be downloaded to the client device. In order to achieve fast download of such image tiles the above disclosed markers and methods for fast image manipulations may be utilized. In such a case it is also desirable that the server has a transmission cache of the tiles extracted from the original image that are requested by the client, so a next client with similar (and likely) needs will have such tiles already available.

Thumbnail Viewing and Stitching:

Using progressive uploading, several progressive streams may be transmitted at the same time. For example, if one hundred JPEG images are to be uploaded to a receiving device from the storing device, instead of uploading one image after another in a serial fashion, progressive uploading is used for uploading a little bit of each image in parallel. This may be beneficial for the end user, who can choose, for example, to after uploading only 10% of the total data of all 100 images, browse thumbnail representation of all the images. If desired, the user, for example when the storing device has a broadband connection to the receiving device, can choose to continue the uploading process until 100% of the data has been transmitted.

The packages may be transmitted from the storing device to the receiving device using the hypertext transfer protocol (HTTP). This protocol is as such known in the art. When requesting small thumbnails, the overhead of every HTTP request may be slower than the transfer itself. Therefore, it may be necessary to stitch several thumbnail versions of the multimedia content into one large file, and send it in a single HTTP function call. This may be enabled by concatenating several multimedia content files and providing an extra header providing information relating to where the individual multimedia content files of the concatenated multimedia content starts and ends. The stitching may be performed either in the actual image domain (i.e. by stitching together the images pixel by pixel into one composite image) or in the file domain (i.e. by stitching together bytes of the different files into one composite file). Stitching in the image domain is typically performed for thumbnail images whereas stitching in the file domain is typically performed for full-scale (i.e. full-resolution) images. In the image domain all images to be stitched may first be organized in a strip of images, i.e. where all images are placed next to each other on a grid of pixels. This may according to an embodiment require that all images along the strip have one common dimension. Here it is assumed that rotation of the images is allowed; for example the images having dimensions 32 by 64 pixels and 64 by 128 pixels, respectively have the common dimension 64 pixels. If all images along the strip do not have one common dimension pixel stuffing (for example by inserting black pixels) may be used to increase the horizontal and/or vertical dimension of the images not fulfilling the common dimension criterion. The images in the strip are then stitched by first forming a common composite image of all the images in the strip and then coding and storing the common composite image in one single file (such as one JPEG file). Alternatively the images can be stitched together in the file domain. In the file domain the images may be stitched together by first forming one or more containers as a multi picture object (MPO) and then coding and storing the MPO file. The use of the MPO format thereby enables images of different dimensions to be stitched together. The above method is particularly advantageous in situations where the receiving device is only able to (or efficient in) decode standard image formats, and to select regions to be displayed.

The disclosed embedded markers allow images of different sizes to be stitched and different amounts of scans to be sent in one bitstream.

Thus if scans of progressive JPEG data for multiple source images are multiplexed or concatenated, no throttling would be needed. This may result in that less overhead information needs to be transmitted. In order to achieve this a large composite progressive JPEG image (i.e. a large image stitched together from many individual images) may be generated either by the uploading device or by the device to which the individual images have been uploaded to. By using the header information a further device may then access and extract regions corresponding to the individual images either for storage or for (individual) displaying. Thereby one composite progressive JPEG image may be used as source image in order to display a plurality of individual thumbnail images on a web page.

In summary there is disclosed means for uploading/downloading images to/from a remote server and for viewing the same. The uploading/downloading of the images to/from the remote server is parallel instead of serial. This means for example that images, instead of being transferred as a sequential stream of bytes, are arranged in scans of image data in such a way that the uploaded/downloaded images can be browsed much earlier (and at lower quality) than if the entire image data is considered. As in the serial case, it is possible to interrupt the uploading/downloading process at any time, and still browse the received image data. Likewise it is possible to re-start the uploading/downloading process in the future.

The invention has mainly been described above with reference to a certain examples. For example, the invention has been disclosed in a client-server scenario. The server may be (in) a network cloud, and the client may be a mobile device with constraint bandwidth. However, as is readily appreciated by a person skilled in the art, other examples than the ones disclosed above are equally possible within the scope of the invention, as defined by the appended patent claims.

According to one scenario the aforedescribed actions of the client device are also implemented in a server. Further, the transmission may be between two similar devices, over any suitable network, such as Internet, WLAN, and Bluetooth.

The invention claimed is:

1. A method comprising:
providing multimedia content at a storing device;
dividing said multimedia content into at least two packages;
classifying, depending on data in said at least two packages and by using a relevance criterion, said at least two packages as a relevant package and at least one less relevant package; and
transmitting said relevant package from said storing device to a receiving device,
wherein a tail is appended to each transmitted package, said tail enabling each transmitted package to be decoded at said receiving device,
wherein said tail comprises information regarding a position in the multimedia content of the package to which said tail is appended,
wherein said multimedia content represent a first and a second multimedia file and wherein said first and second multimedia files each are divided and classified into a relevant package and at least one less relevant package, and
wherein the second of said first and second multimedia files is provided after at least one of said at least one less relevant package of said first multimedia file has been transmitted,
said method further comprising transmitting said relevant package of said second multimedia file before transmitting the remaining of said at least one less relevant package of said first multimedia file.

2. The method according to claim 1, further comprising
ordering, by using said relevance criterion, said at least one less relevant package in descending relevance; and
transmitting the remaining of said at least one less relevant package from said storing device to said receiving device according to said ordering.

3. The method according to claim 1, wherein said multimedia content represent at least two multimedia files and wherein said at least two multimedia files each are divided and classified into a relevant package and at least one less relevant package, said method further comprising transmitting each of one of said relevant packages before transmitting any of said at least one less relevant packages.

4. The method according to claim 1, wherein said relevant package comprises information enabling a preview of the multimedia content.

5. The method according to claim 1, wherein said multimedia content is progressively decodable.

6. The method according to claim 1, wherein said multimedia content conforms with at least one standard from the group of SPIHT, JPEG, JPEG progressive, JPEG2000, WebP, and JPEG XR.

7. The method according to claim 1, wherein in a case said multimedia content is not progressively decodable, said method further comprising transcoding said multimedia content into a progressively decodable representation before dividing said multimedia content.

8. An apparatus comprising:
at least one processor; and
at least one memory including computer program code for one or more programs, the at least one memory and the computer program code configured to, with the at least one processor, cause the apparatus to at least:
provide multimedia content;
divide said multimedia content into at least two packages;
classify, depending on data in said at least two packages and by using a relevance criterion, said at least two packages as a relevant package and at least one less relevant package; and
transmit said relevant package to a receiving device,
wherein a tail is appended to each transmitted package, said tail enabling each transmitted package to be decoded at said receiving device,
wherein said tail comprises information regarding a position in the multimedia content of the package to which said tail is appended,
wherein said multimedia content represent a first and a second multimedia file and wherein said first and second multimedia files each are divided and classified into a relevant package and at least one less relevant package, and
wherein the second of said first and second multimedia files is provided after at least one of said at least one less relevant package of said first multimedia file has been transmitted, and
the apparatus is further caused to: transmit said relevant package of said second multimedia file before transmitting the remaining of said at least one less relevant package of said first multimedia file.

9. The apparatus according to claim 8, wherein the apparatus is further caused to:
order, by using said relevance criterion, said at least one less relevant package in descending relevance; and transmit the remaining of said at least one less relevant package to said receiving device according to said ordering.

10. The apparatus according to claim 8, wherein said multimedia content represent at least two multimedia files and wherein said at least two multimedia files each are divided and classified into a relevant package and at least one less relevant package, the apparatus is further caused to: transmit each of one of said relevant packages before transmitting any of said at least one less relevant packages.

11. The apparatus according to claim 8, wherein said relevant package comprises information enabling a preview of the multimedia content.

12. The apparatus according to claim 8, wherein said multimedia content is progressively decodable.

13. The apparatus according to claim 8, wherein said multimedia content conforms with at least one standard from the group of SPIHT, JPEG, JPEG progressive, JPEG2000, WebP, and JPEG XR.

14. The apparatus according to claim 8, wherein in a case said multimedia content is not progressively decodable, the apparatus is further caused to: transcode said multimedia content into a progressively decodable representation before dividing said multimedia content.

15. A computer program product comprising a non-transitory computer readable medium having computer executable program code stored thereon, which when executed by a processor causes an apparatus to perform the method of claim 1.

* * * * *